United States Patent Office 3,035,890
Patented May 22, 1962

3,035,890
PROCESS FOR THE PRODUCTION OF SF$_5$Cl
Hugh Leithead Roberts, Winnington Hall, Northwich England, assignor to Imperial Chemical Industries Limited, London, England, a corporation of Great Britain
No Drawing. Filed Apr. 28, 1960, Ser. No. 25,248
Claims priority, application Great Britain May 13, 1959
6 Claims. (Cl. 23—14)

This invention relates to sulphur halogen compounds particularly to sulphur chloride pentafluoride and sulphur tetrafluoride and to a new method for making these two compounds.

In co-pending British application 2,543/59 we have disclosed a new method of making sulphur chloride pentafluoride in which sulphur tetrafluoride is reacted with chlorine trifluoride or chlorine monofluoride. We have now found that chlorine trifluoride can react with elementary sulphur to give a mixture of products one of which is sulphur chloride pentafluoride.

According to our invention we prepare sulphur chloride pentafluoride by reacting chlorine trifluoride with elementary sulphur in the absence of moisture and subsequently separating sulphur chloride pentafluoride from the other products of reaction. The latter consist mainly of sulphur tetrafluoride and chlorine and a small proportion of sulphur hexafluoride; if excess sulphur is present the chlorine is converted into sulphur chlorides, and as these are liquids at room temperature they can be readily separated from sulphur chloride pentafluoride, sulphur tetrafluoride and sulphur hexafluoride which are all gases at room temperature.

Another aspect of the invention is that the reaction between elementary sulphur and chlorine trifluoride provides a useful new method of making sulphur tetrafluoride.

The reaction is strongly exothermic and it is important to cool the reaction system sufficiently to prevent the sulphur melting, which would reduce surface-area available for reaction. This means in practice that the reaction takes place at a temperature below 112° C. and a convenient range is 15°–105° C. Ordinary commercial sulphur in small lumps may be used, and a suitable way of bringing it into contact with the vapour of chlorine trifluoride is to spread it in a thin layer in copper trays or inside copper tubes, the latter being perhaps more convenient for cooling purposes.

It is advisable to dilute the chlorine trifluoride with an inert gas, for example dry nitrogen, three- or four-fold by volume. Such a mixture, when led over excess sulphur loosely packed in a copper tube of 1½ inches internal diameter at a rate of about 1.5 litres per minute, yields a mixture of products containing for example by weight about 20% of sulphur chloride pentafluoride, 40% of sulphur chlorides, 40% of sulphur tetrafluoride, and 0.5% of sulphur hexafluoride. The gaseous mixture of sulphur chloride pentafluoride, sulphur tetrafluoride and sulphur hexafluoride can readily be separated from the liquid sulphur chlorides and then, if desired, liquefied in a suitable cold trap, but owing to the formation of a ternary azeotrope it is not possible to isolate pure sulphur chloride pentafluoride by fractional distillation of the liquefied gases.

One way of avoiding this difficulty is to remove the sulphur tetrafluoride by hydrolysis in acidified ferrous sulphate solution, which will also absorb any traces of chlorine, and subsequently to absorb in acid sodium dichromate solution the sulphur dioxide formed by the hydrolysis. Another way is to remove sulphur tetrafluoride as the double fluoride with boron trifluoride BF$_3$.SF$_4$ which is a solid, from which sulphur tetrafluoride may subsequently be recovered, for example by the known method in which the vapour of the double fluoride at 80–90° C. is passed over heated sodium fluoride which removes boron trifluoride thus liberating sulphur tetrafluoride. Having removed the sulphur tetrafluoride the mixture of sulphur chloride pentafluoride and sulphur hexafluoride may be separated by fractional distillation or by gas-chromatography using a column of a polychlorofluorohydrocarbon. Gas-chromatography can in fact be used to separate all the gaseous products of the reaction between sulphur and chlorine trifluoride.

In another method sulphur tetrafluoride is not removed from the mixture of gaseous products but converted into additional sulphur chloride pentafluoride by reacting it in situ with chlorine monofluoride as disclosed in co-pending application 2,543/59.

The yields of sulphur chloride pentafluoride and sulphur tetrafluoride depend on the concentration of chlorine trifluoride in the gaseous phase. Thus at low concentrations of the order of 5% by volume the gaseous reaction products are mainly sulphur tetrafluoride, whereas at high concentrations above about 30% sulphur hexafluoride begins to be increasingly formed. The optimum conditions are a concentration of 20–25% and an excess of sulphur to take up the chlorine. The sulphur is preferably in bean-sized lumps such as may be obtained by breaking down ordinary commercial lump sulphur.

*Example*

A copper tube three feet in length and 1½ inches internal diameter, and fitted with a cooling jacket, was charged with approximately 950 g. broken lump sulphur spread evenly along the length. The exit end of the tube was connected to two cold traps in series, the first cooled with ice to collect chlorides of sulphur and the second with solid carbon dioxide to liquefy sulphur chloride pentafluoride, sulphur tetrafluoride and sulphur hexafluoride. A stream of chlorine trifluoride diluted with four times its volume of dry nitrogen was passed through the tube at a rate of about 1.5 litres/minute for 4 hours. This corresponds to about 250 g. of chlorine trifluoride. The temperature was not allowed to rise above 105° C. Approximately 176 g. of sulphur chlorides, mostly sulphur monochloride, were collected in the first trap and 244 g. of products in the second. From the latter, about 160 g. of sulphur tetrafluoride was removed by reaction with boron trifluoride to give solid BF$_3$.SF$_4$, leaving about 84 g. of a mixture of sulphur chloride pentafluoride and sulphur hexafluoride from which approximately 80 g. of sulphur chloride pentafluoride was separated by fractional distillation. It was a colourless liquid which boiled at —21° C. and showed the characteristic strong infra-red absorption bands at wave number values of 905 cm.$^{-1}$ and 854 cm.$^{-1}$.

Sulphur tetrafluoride was recovered from the double fluoride SF$_4$.BF$_3$ by heating the latter to between 80° and 90° C. to vaporise it and passing the vapour over heated sodium fluoride. The latter abstracts boron trifluoride to give solid sodium fluoborate and thus liberates sulphur tetrafluoride which was condensed out in a cold trap.

What we claim is:

1. A process for the manufacture of sulfur chloride pentafluoride, SF$_5$Cl, comprising reacting chlorine trifluoride with elementary sulfur under anhydrous conditions while maintaining the temperature between 15° and 105° C., and then separating sulfur chloride pentafluoride from the other products of the reaction.

2. A process as set forth in claim 1 in which the chlorine trifluoride is mixed with an inert dry gas in sufficient amount to give a concentration of chlorine trifluoride in the gaseous phase of 20–25% by volume.

3. A process as set forth in claim 1 in which the gaseous products of the reaction comprise chlorine, sulfur tetrafluoride, sulfur hexafluoride and sulfur chloride pentafluoride, and the chlorine and sulfur tetrafluoride are removed by absorption in acidified ferrous sulfate solution and by hydrolysis respectively and sulfur chloride pentafluoride is then separated from sulfur hexafluoride by fractional distillation.

4. A process as set forth in claim 1 in which the gaseous products of the reaction comprise chlorine, sulfur tetrafluoride, sulfur hexafluoride and sulfur chloride pentafluoride, and the chlorine and sulfur tetrafluoride are removed by absorption in acidified ferrous sulfate solution and by combination with boron trifluoride to form the solid double fluoride of sulfur tetrafluoride and boron trifluoride respectively and sulfur chloride pentafluoride is then separated from sulfur hexafluoride by fractional distillation.

5. A process as set forth in claim 4 including recovering sulfur tetrafluoride by heating said double fluoride to vaporization and passing the vapor over heated sodium fluoride.

6. A process as set forth in claim 1 in which the gaseous products of reaction comprise sulfur chloride pentafluoride, sulfur tetrafluoride, chlorine and sulfur hexafluoride and said gaseous products are separated from each other by gas chromatography using a column composed of a polychlorofluorohydrocarbon.

References Cited in the file of this patent

Ruff et al.: "Zeitschrift für Anorganische und Allgemeine Chemie," vol. 190, pages 270–276, 1930.